April 27, 1948.   P. G. CHEVIGNY   2,440,245
COOLING OF HIGH TEMPERATURE BODIES
Filed March 13, 1944
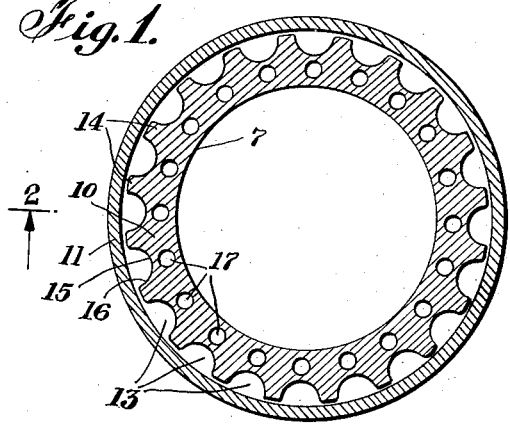
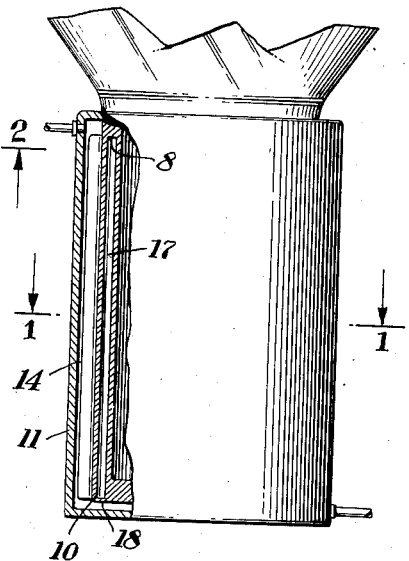
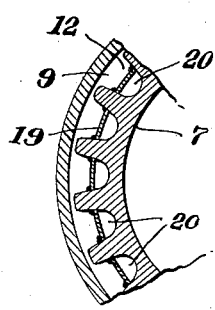
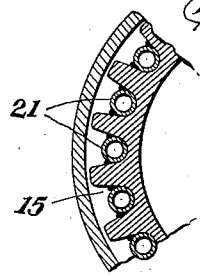
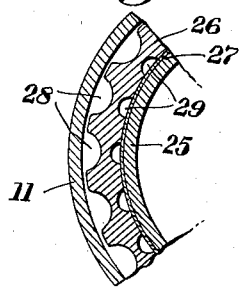
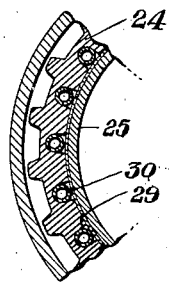
INVENTOR.
PAUL G. CHEVIGNY
BY
ATTORNEY Patented Apr. 27, 1948

2,440,245

UNITED STATES PATENT OFFICE 2,440,245

COOLING OF HIGH-TEMPERATURE BODIES

Paul Georges Chevigny, New York, N. Y., assignor to Federal Telephone and Radio Corporation, New York, N. Y., a corporation of Delaware Application March 13, 1944, Serial No. 526,168

19 Claims. (Cl. 250—27.5)

This invention relates to cooling of high temperature bodies with specific relation to the liquid cooling of vacuum tube anodes.

In the art of cooling hot bodies by fluid means, such as for example a liquid, generally the greater the surface of the hot body in contact with the liquid the greater the cooling effect. In accordance with this principle more rapid cooling may be obtained by providing grooves in the surface of the hot body which makes contact with the liquid or by providing fins extending from said surface with the surface of the hot body forming the bottom of the grooves lying between said fins. The surface area making contact with the liquid is thereby increased substantially and may be several times the area of the surface of the hot body without such construction. The benefits to be expected from this construction are to some extent not realized due to the fact that the liquid tends to start boiling at the bottoms of the grooves even though the sides of the grooves are well below the temperature at which the liquid boils. The vapor thus formed is a relatively inefficient cooling medium, and the rate of heat dissipation is reduced, while additionally the resulting turbulence of the liquid still in contact with the grooves effects a further reduction in the efficiency of utilization of the cooling medium.

An object of the present invention is the provision of an arrangement for cooling with a liquid medium, a hot body having grooves therein whereby boiling of the liquid at the bottoms of the grooves is prevented.

Another object of the present invention is the provision of an arrangement for cooling a hot body of the type described, whereby the temperature at the bottoms of the grooves more nearly approximates the temperature at the sides of the grooves.

Another object of the present invention is the provision of an arrangement for cooling a hot body of the type described, whereby the bottoms of the grooves are maintained at a relatively low temperature.

Other and further objects and advantages of the present invention will become apparent and the foregoing will be best understood from the following description of embodiments thereof, reference being had to the drawings in which:

Fig. 1 is a sectional plan view of a hot body, specifically an anode of a high power electron tube, and an arrangement for cooling same;

Fig. 2 is an elevational view, partly in section, taken along the line 2—2 of the anode and jacket of Fig. 1;

Figs. 3, 4, 5 and 6 are fragmentary sectional plan views of modified forms of my invention.

Referring now to Figs. 1 and 2 the numeral 10 designates a hot body, namely, an anode which may be the anode of a high power-transmitting tube. Anode 10 which may be of copper or other desired metal or metals having high heat conductivity is surrounded by a jacket or enclosure member 11 which is spaced a distance therefrom to allow a liquid medium to be circulated therebetween. In order to provide maximum surface for the anode 10, I prefer to provide grooves 13 on said anode cooling fins or projecting portions 14 extending outwardly between the grooves 13. The liquid medium which may be water, or whatever suitable liquid is desired, is circulated between the jacket 11 and the anode 10, and circulates through the grooves 13 as well as past the ends of the fins or projections 14.

If not for the means hereinafter to be described, the bottoms 15 of the grooves 13 would be at a higher temperature than the sides 16 of the fins or projecting portions 14. This is attributable in part to the fact that the heat conduction paths to the bottoms 15 from the part of the hot body at the highest temperatures would be shorter than to the sides 16 of projecting portions 14. The part of the hot body at the highest temperature would be the inner surface 7 which is heated by cathodic radiation and electronic bombardment.

In such case there would be a tendency, as the temperature of the hot body rises for the liquid to boil adjacent said bottoms 15, turn to vapor and become turbulent. Since this would result in a serious loss of efficiency in cooling, I prefer to provide the following means for preventing this.

Adjacent the bottoms 15 of said grooves 13 and directly between said bottoms and the relatively high temperature inner surface 7, I prefer to provide openings or holes 17 which may be bored, drilled or otherwise formed in the hot body itself. The liquid and cooling medium does not circulate through these holes 17. The upper ends 8 and the lower ends 18 of openings 17 are sealed by any suitable means to prevent entry of the liquid therein, but being merely filled with air or another relatively low heat-conductive medium. It will be seen that these holes 17 provide thermally relatively low conductive paths between the inner surface 7 of the anode and bottoms 15 of the grooves, thus retarding the flow of heat to said bottoms and maintaining them at lower temperatures than would otherwise obtain. As a result the temperatures at the sides 16 of the grooves and at the projecting portions 14 of said hot body tend to be more nearly equal to the temperature at the bottoms of the grooves than would be the case if such low conductivity paths were not provided. It will be apparent that by selecting the dimensions of the holes or openings 17 and/or the distance of these openings from the bottoms of the grooves the desired relative temperatures of the bottoms and the sides of the grooves can be obtained.

Referring now to Fig. 3 a modified arrangement utilizing the principles hereinbefore stated is disclosed. While the arrangement shown in Fig. 1 is satisfactory where the anode is not too long it will be appreciated that difficulties are involved in boring through long anodes. In such case where the anode is relatively long I prefer to utilize the arrangement shown in Fig. 3. In this arrangement I provide channels 9 preferably of greater depth than grooves 13 in the arrangement of Fig. 1. To provide the thermally low-conductive path and prevent boiling of the liquid at the bottom of the groove, I prefer to braze or otherwise secure bands 19 of thermally relatively high conductivity metal, such as copper, across some intermediate point between the top and bottom of the channel 9 thereby providing a separated air space 20 at the bottom of the channel 9 through which the liquid does not flow, and an open portion or groove 12 at the top of the channel through which the liquid flows. These spaces 20 serve to provide paths of low heat conductivity between the inner surface 7 and the bottoms of the grooves, the bottoms of the grooves being bands 19.

Another method for providing separated air spaces at the bottom of the channels 9 is shown in Fig. 4. In said figure, hollow members, such as for example, tubes 21, may be brazed or otherwise secured at the bottoms of the channels. The tubes 21 are preferably made of a relatively high heat-conductive material. The cooling liquid does not enter these tubes 21. It will be seen that tubes 21 likewise provide thermally low-conductive paths from the inner surface 7 to the bottoms of the grooves, which bottoms are defined by the outwardly facing portions of the tubes 21. Tubes 21, as well as bands 19 of Fig. 3, may be considered as part of the hot body since they are secured thereto and are in heat conductive contact therewith.

In the embodiments hereinbefore described, it will be noted that the anode core is relatively thick and therefore the weight of the anode would be very great. In the embodiment illustrated in Fig. 5 the anode 25 may be relatively thin. An intermediate member 26 of preferably relatively high heat conductivity material such as copper may be arranged about and secured to the anode 25 by means of a low melting point metal 27 or alloy, such as silver alloy or the like. Said intermediate member 26 may be considered as part of a hot body including anode 25.

The intermediate member 26 may be provided on its outside with grooves 28. Grooves 29 may also be provided on the side of intermediate member 26 opposite said grooves 28, the bottoms of grooves 28 and the bottoms of grooves 29 being adjacent each other. Grooves 29 serve to form air spaces which provide paths of relatively low heat conductivity from the anode to the bottoms of the grooves 28. A liquid jacket or enclosure member 11 is arranged around the intermediate member 26 facing the grooves 28 and the liquid medium is circulated between the liquid jacket 11 and the intermediate member 26, the liquid passing through the grooves 28.

A modification of Fig. 5 is shown in Fig. 6. When securing the intermediate member 24 to the anode 25 some of the alloy or low melting temperature metal may enter and fill said grooves 29. To prevent this, hollow members or tubes 30 may be secured in said grooves 29 by brazing or other suitable means before the intermediate member 24 is joined to the anode 25 and these hollow members 24 will serve to keep said low melting temperature metal out of the grooves 29.

From the foregoing it will be seen that I have provided a means for lowering the temperature at the bottoms of the grooves formed in the surface of a hot body, thereby preventing boiling of the liquid at said bottoms and more nearly equalizing the temperatures of the entire surface of the hot body which is in contact with the liquid-cooling medium. Moreover, it will be seen that I have provided various simple arrangements for procuring this result.

Obviously various further modifications may be made without departing from the teachings of this invention. For example, the enclosure member might be arranged against the ends of the fins or projecting portions so that the liquid medium circulates solely through the grooves and not over said ends. Moreover instead of cutting grooves into the anode surface to provide fins or projecting portions between said grooves, separate fin elements may be attached at spaced intervals to thereby form grooves between said fin elements without the necessity of cutting them in the anode surface.

Therefore while I have described above the principles of my invention in connection with specific apparatus, and particular modifications thereof, it is to be clearly understood that this description is made only by way of example and not as a limitation on the scope of my invention as set forth in the objects of my invention and the accompanying claims.

I claim:

1. In combination, an anode structure having a heated surface and a longitudinally corrugated cooled surface, means for passing a liquid cooling medium over said cooled surface, and heat flow deviation means arranged between said heated surface and the bottom portion of the grooves of said cooled surface in such a way as to provide longer heat conducting paths from the heated surface to the bottom of said grooves than without said heat flow deviation means.

2. A metal anode structure heated on one surface comprising, alternate ridges and grooves on a surface of the structure opposite the surface being heated, means for passing a cooling liquid over the ridges and grooves, and heat flow deviation means arranged between the heated surface and the grooves in such a way as to lengthen the heat conducting path and to provide a reduced cross-sectional area of said path adjacent the bottom portions of said grooves.

3. In combination, a hot body adapted to be cooled by means of an outside liquid medium circulating over a surface thereof extending over cooling fins of relatively high heat conductivity projecting from said body, means for circulating the liquid medium over exposed portions of said surface and said fins, and means in the said body arranged to form paths of relatively low heat conductivity between the fins of relatively high heat conductivity.

4. In combination, a hot body of relatively high heat conductivity adapted to be cooled by means of a liquid medium, said hot body having an exposed surface extending over portions projecting from the body, an enclosure member arranged adjacent to and enclosing said exposed surface, means for circulating the liquid medium over said exposed surface between the hot body and the enclosure member, and means in the said body forming paths of relatively low thermal conductivity intermediate the relatively high temperature projecting portions of said body and the non-projecting portions of said exposed surface adapted to impede heat transference to said non-projecting portions.

5. In combination, a hot body of relatively high heat conductivity adapted to be heated on one surface and to be cooled on the opposite surface by means of a liquid medium, said hot body having grooves forming surfaces extending inwardly towards said heated surface thereof, an enclosure member enclosing said cooled surface, means for circulating the liquid medium between said surface and the enclosure member and through the grooves, means in the said body forming paths of relatively low heat conductivity between the bottoms of the grooves and relatively high temperature portions of said body adapted to impede heat transference to said bottoms.

6. In combination, a hot structure adapted to be cooled by means of a liquid medium, said hot structure having grooves extending inwardly from a surface thereof, an enclosure member enclosing said surface, means for circulating the liquid medium between said surface and the enclosure member and through the grooves, said structure having openings therein intermediate the bottoms of the grooves and relatively high temperature portions of said structure adapted to impede heat transference to said bottoms.

7. In combination, a hot structure adapted to be cooled by means of a liquid medium, said hot structure having grooves extending inwardly from a surface thereof, an enclosure member enclosing said surface, means for circulating the liquid medium between said surface and the enclosure member and through the grooves, said structure having air spaces adjacent the bottoms of said grooves between said bottoms and the relatively high temperature portions of said structure, said air spaces being adapted to impede heat transference to said bottoms.

8. In combination, a hot body adapted to be cooled by means of a liquid medium, said hot body having channels in a surface thereof, an enclosure member enclosing said surface, means for circulating the liquid medium between the enclosure member and said surface and through the channels, and means for closing off portions of said channels towards the bottoms thereof to prevent the liquid medium from circulating therethrough.

9. In combination, a hot body adapted to be cooled by means of a liquid medium, said hot body having channels in a surface thereof, an enclosure member enclosing said surface, means for circulating the liquid medium between the enclosure member and said surface and through the channels, and elements arranged in said channels isolating air spaces towards the bottoms thereof from the liquid medium.

10. A combination according to claim 6 wherein said elements are of relatively high heat conductivity.

11. In combination, a hot body of relatively high thermal conductivity adapted to be cooled by means of a liquid medium, said hot body having grooves extending inwardly from a surface thereof, an enclosure member enclosing said surface, means for circulating the liquid medium between the enclosure member and said surface and through the grooves, and hollow members arranged between the bottoms of the grooves and relatively high temperature portions of said body, thereby forming paths of relatively low thermal conductivity to said bottoms.

12. In combination, a hot body adapted to be cooled by means of a liquid medium, a jacket for the liquid medium spaced from said hot body, an intermediate member arranged between the jacket and the hot body, and having grooves extending inwardly from opposite sides thereof, the bottoms of the grooves on one side being adjacent the bottoms of the grooves on the other side, said one side being in contact with the hot body, and said other side being spaced from and facing said jacket, and means for circulating the liquid medium between said jacket and said other side of the intermediate member.

13. The combination according to claim 12 wherein the intermediate member is of high heat conductivity.

14. In combination, a hot body adapted to be cooled by means of a liquid medium circulating over a surface thereof, said surface having channels formed therein, means for circulating a liquid medium over said surface and through said channels, and elements, connecting the sides of the channels, positioned intermediate the tops and bottoms of said channels so as to isolate spaces towards the bottoms of said channels from the liquid medium.

15. In combination, an anode adapted to be cooled by means of a liquid medium circulating over a surface thereof, fins projecting from said surface and forming channels therebetween, means for circulating a liquid medium over said surface and fins, and an element, connecting a pair of adjacent fins, positioned intermediate the top and bottom of the channel formed between said pair of adjacent fins to thereby isolate a space towards the bottom of said channel from the liquid medium.

16. In combination, a hot body adapted to be cooled by means of a liquid medium, said hot body having channels in a surface thereof, an enclosure member enclosing said surface, means for circulating the liquid medium between the hot body and the enclosure member and through the channels, and hollow members arranged in the bottoms of said channels isolating air spaces therein from the liquid medium.

17. In combination, an anode adapted to be cooled by means of a liquid medium, an enclosure member spaced from said anode and an intermediate member of relatively high heat conductivity arranged between said enclosure member and said anode and having one side thereof in contact with said anode and the other side facing the enclosure member, said intermediate member having a plurality of grooves extending inwardly in said sides, the bottoms of the grooves on one side being adjacent the bottoms of the grooves on the other side, hollow members arranged in the grooves on the side in contact with the anode, isolating air spaces within said grooves, and means for circulating the liquid medium between the enclosure member and the intermediate member and through the grooves on the side of said intermediate member facing the enclosure member.

18. A wall of relatively high heat conducting metal adapted to receive heat on one surface and to dissipate the heat at the opposite surface, one of said surfaces being corrugated to extend its heat transfer area, and means in the said wall for selectively constricting the flow of heat through the thinner portions of said wall.

19. A metal wall adapted to receive heat on one surface and to dissipate the heat at the opposite surface, means in the said wall arranged along spaced lines on one of said surfaces for constricting the flow of heat through the wall, and fins on said wall between said spaced lines.

PAUL GEORGES CHEVIGNY.

REFERENCES CITED

The following references are of record in the file of this patent:

UNITED STATES PATENTS

| Number | Name | Date |
|---|---|---|
| 2,362,911 | Litton | Nov. 14, 1944 |
| 2,346,929 | Litton | Apr. 18, 1944 |
| 1,201,271 | De Forest | Oct. 17, 1916 |
| 1,857,077 | Adamson | May 3, 1932 |
| 1,874,578 | Morrison | Aug. 30, 1932 |
| 2,264,102 | Tretter | Nov. 25, 1941 |
| 2,132,174 | Machlett | Oct. 3, 1938 |
| 2,362,911 | Litton | Nov. 14, 1944 |
| 1,978,424 | Gebhard | Oct. 30, 1934 |
| 2,146,352 | Rohrer | Feb. 7, 1939 |
| 1,453,220 | Witzenmann | Apr. 24, 1923 |

FOREIGN PATENTS

| Number | Country | Date |
|---|---|---|
| 382,996 | Great Britain | Nov. 10, 1932 |
| 362,995 | France | Apr. 21, 1906 |